United States Patent
Matsumoto et al.

(10) Patent No.: US 9,740,240 B1
(45) Date of Patent: Aug. 22, 2017

(54) BASE WITH ROTATING MOUNT THAT INCREASES FRICTION OF ROTATION WHEN PORTABLE COMPUTING DEVICE IS PLACED ONTO MOUNT

(71) Applicant: GOOGLE INC., Mountain View, CA (US)

(72) Inventors: George Matsumoto, San Jose, CA (US); James Tanner, Los Gatos, CA (US); Rachael Elizabeth Roberts, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/075,992

(22) Filed: Mar. 21, 2016

(51) Int. Cl.
 *G06F 1/16* (2006.01)
 *G06F 3/02* (2006.01)
(52) U.S. Cl.
 CPC .......... *G06F 1/1632* (2013.01); *G06F 1/1626* (2013.01); *G06F 3/0202* (2013.01)
(58) Field of Classification Search
 CPC combination set(s) only.
 See application file for complete search history.

(56) References Cited

U.S. PATENT DOCUMENTS

| | | | |
|---|---|---|---|
| 3,507,000 | A | 4/1970 | Strien et al. |
| 3,806,852 | A | 4/1974 | Suska |
| 4,993,975 | A | 2/1991 | Asick et al. |
| 5,229,757 | A | 7/1993 | Takamiya et al. |
| 5,267,123 | A | 11/1993 | Boothroyd et al. |
| 5,278,725 | A | 1/1994 | Konno et al. |
| 5,379,183 | A | 1/1995 | Okonsky et al. |
| 5,548,478 | A | 8/1996 | Kumar et al. |
| 5,638,883 | A | 6/1997 | Schulte |
| 5,708,561 | A | 1/1998 | Huilgol et al. |

(Continued)

FOREIGN PATENT DOCUMENTS

| | | |
|---|---|---|
| EP | 1227387 A1 | 7/2002 |
| EP | 1916826 A1 | 4/2008 |

(Continued)

OTHER PUBLICATIONS

International Search Report and Written Opinion received for PCT Patent Application No. PCT/US2011/066182, mailed on Mar. 8, 2012, 19 pages.

(Continued)

*Primary Examiner* — Lisa Lea Edmonds
(74) *Attorney, Agent, or Firm* — Brake Hughes Bellermann LLP (57) ABSTRACT

A base for a portable computing device may comprise a keyboard, a frame, a shaft, a mount, and a shaft engagement element. The keyboard may be configured to communicate with the portable computing device. The frame may surround the keyboard. The shaft may be rotationally attached to the frame. The rotational attachment of the shaft to the frame may have a friction greater than a force of gravity on the portable computing device. The mount may be configured to hold the portable computing device. The mount may define a shaft recess through which the shaft extends and in which the shaft freely rotates. The shaft engagement element may be configured to rotationally couple the mount to the shaft in response to the portable computing device being placed on the mount.

20 Claims, 8 Drawing Sheets

(56) References Cited

U.S. PATENT DOCUMENTS

| | | | |
|---|---|---|---|
| 5,751,544 A | 5/1998 | Song | |
| 5,761,961 A | 6/1998 | Krauss et al. | |
| 5,771,540 A | 6/1998 | Carpenter et al. | |
| 5,805,415 A | 9/1998 | Tran et al. | |
| 5,987,704 A | 11/1999 | Tang | |
| 6,182,330 B1 | 2/2001 | Novin et al. | |
| 6,223,393 B1 | 5/2001 | Knopf | |
| 6,384,811 B1 | 5/2002 | Kung et al. | |
| 6,392,877 B1 | 5/2002 | Iredale | |
| 6,404,622 B1 | 6/2002 | Chen | |
| 6,470,532 B2 | 10/2002 | Rude | |
| 6,481,057 B2 | 11/2002 | Lin | |
| 6,483,445 B1 | 11/2002 | England | |
| 6,519,812 B2 | 2/2003 | Ko et al. | |
| 6,522,529 B1 | 2/2003 | Huilgol et al. | |
| 6,690,579 B1 | 2/2004 | Ribeiro | |
| 6,714,403 B2 | 3/2004 | Furuki et al. | |
| 6,751,090 B1 | 6/2004 | Yang | |
| 6,816,365 B2 | 11/2004 | Hill et al. | |
| 6,842,338 B2 | 1/2005 | Iredale | |
| 6,850,226 B2 | 2/2005 | Finke-Anlauff | |
| 6,900,981 B2 | 5/2005 | Kuivas et al. | |
| 6,903,927 B2 | 6/2005 | Anlauff | |
| 6,940,713 B2 * | 9/2005 | Huang | G06F 1/1632 345/905 |
| D517,541 S | 3/2006 | Maskatia | |
| D519,500 S | 4/2006 | Maskatia et al. | |
| 7,055,215 B1 | 6/2006 | Ligtenberg et al. | |
| 7,092,246 B2 | 8/2006 | Tanaka et al. | |
| D528,541 S | 9/2006 | Maskatia | |
| 7,107,084 B2 | 9/2006 | Duarte et al. | |
| 7,129,931 B2 | 10/2006 | Pappas | |
| 7,203,058 B2 | 4/2007 | Hong | |
| 7,215,538 B1 | 5/2007 | Chen et al. | |
| 7,512,426 B2 | 3/2009 | Maatta et al. | |
| 7,639,494 B2 * | 12/2009 | Lin | F16M 11/10 340/573.1 |
| 7,646,593 B2 | 1/2010 | Smejkalova | |
| 7,652,873 B2 * | 1/2010 | Lee | E05B 65/006 248/917 |
| 7,656,661 B2 | 2/2010 | Shaum | |
| 7,667,959 B2 | 2/2010 | Pelkonen | |
| 7,679,890 B2 | 3/2010 | Yang | |
| 7,755,904 B2 | 7/2010 | Wu et al. | |
| D621,827 S | 8/2010 | Cheng et al. | |
| 7,984,532 B2 | 7/2011 | Huang | |
| D649,543 S | 11/2011 | Tseng et al. | |
| 8,091,178 B2 | 1/2012 | Degner et al. | |
| 8,200,300 B2 | 6/2012 | Wang et al. | |
| 8,353,082 B2 | 1/2013 | Naukkarinen | |
| 8,638,546 B2 | 1/2014 | Hoshino | |
| D700,600 S | 3/2014 | Matsuoka | |
| 8,904,601 B2 | 12/2014 | Hsu | |
| 8,947,871 B2 * | 2/2015 | Lin | H05K 5/0239 361/679.09 |
| 9,001,504 B2 | 4/2015 | Han | |
| 2003/0226238 A1 | 12/2003 | Baer | |
| 2004/0174666 A1 | 9/2004 | Brandenberg et al. | |
| 2004/0246668 A1 * | 12/2004 | Maskatia | G06F 1/162 361/679.55 |
| 2005/0041378 A1 | 2/2005 | Hamada et al. | |
| 2005/0041381 A1 * | 2/2005 | Maskatia | G06F 1/1616 361/679.06 |
| 2005/0101441 A1 | 5/2005 | Rosborough et al. | |
| 2005/0122318 A1 | 6/2005 | Tonouchi et al. | |
| 2005/0122671 A1 | 6/2005 | Homer | |
| 2005/0200608 A1 | 9/2005 | Ulla et al. | |
| 2005/0273978 A1 | 12/2005 | Norman, Jr. | |
| 2006/0238970 A1 | 10/2006 | Ukonaho et al. | |
| 2006/0256516 A1 * | 11/2006 | Cho | G06F 1/1616 361/679.29 |
| 2006/0267947 A1 | 11/2006 | Nishiyama et al. | |
| 2006/0279920 A1 | 12/2006 | Lee et al. | |
| 2007/0094846 A1 | 5/2007 | Ishida | |
| 2007/0186382 A1 | 8/2007 | Huang | |
| 2008/0047102 A1 | 2/2008 | Kim | |
| 2008/0120809 A1 | 5/2008 | Nakasone | |
| 2008/0180892 A1 | 7/2008 | Lai | |
| 2008/0238816 A1 | 10/2008 | Matsushita | |
| 2009/0007383 A1 | 1/2009 | Lee | |
| 2009/0068429 A1 | 3/2009 | Kmiec et al. | |
| 2009/0117953 A1 | 5/2009 | Oh | |
| 2009/0176391 A1 | 7/2009 | Brock et al. | |
| 2009/0244009 A1 * | 10/2009 | Staats | G06F 1/162 345/168 |
| 2010/0014237 A1 | 1/2010 | Takizawa | |
| 2010/0295426 A1 | 11/2010 | Zhu et al. | |
| 2011/0058916 A1 | 3/2011 | Toosky | |
| 2011/0211307 A1 | 9/2011 | Takizawa | |
| 2012/0020002 A1 | 1/2012 | Mathew et al. | |
| 2012/0106060 A1 | 5/2012 | Probst et al. | |
| 2012/0154999 A1 | 6/2012 | Park | |
| 2012/0162889 A1 | 6/2012 | Han | |
| 2012/0330201 A1 | 12/2012 | Turner et al. | |
| 2013/0039000 A1 | 2/2013 | Vicente et al. | |
| 2014/0029185 A1 | 1/2014 | Leong et al. | |
| 2014/0071603 A1 | 3/2014 | Matsuoka et al. | |
| 2015/0138713 A1 | 5/2015 | Onda | |
| 2015/0338889 A1 | 11/2015 | Liu et al. | |

FOREIGN PATENT DOCUMENTS

| | | |
|---|---|---|
| EP | 2993549 A1 | 3/2016 |
| WO | 96/03685 A1 | 2/1996 |
| WO | 2012/092022 A1 | 7/2012 |
| WO | 2014/039430 A1 | 3/2014 |

OTHER PUBLICATIONS

International Preliminary Report on Patentability received for PCT Patent Application No. PCT/US2011/066182, mailed on Jul. 11, 2013, 10 pages.

International Search Report and Written Opinion received for PCT Patent Application No. PCT/US2013/057810, mailed on Dec. 18, 2013, 11 pages.

International Preliminary Report on Patentability received for PCT Patent Application No. PCT/US2013/057810, mailed on Mar. 19, 2015, 8 pages.

Office Action received for Chinese Patent Application No. 201390000867.6, mailed on Jul. 7, 2015, 1 page. (Official Copy only).

Response to Office Action for Chinese Patent Application No. 201390000867.6, filed on Sep. 9, 2015, 47 pages. (Official Copy only).

Office Action received for Chinese Patent Application No. 201390000867.6, mailed on Sep. 21, 2015, 1 page. (Official Copy only).

Response to Office Action for Chinese Patent Application No. 201390000867.6, filed on Dec. 7, 2015, 32 pages. (Official Copy only).

Notice of Decision to Grant received for Chinese Patent Application No. 201390000867.6, mailed on Dec. 28, 2015, 4 pages. (2 pages English Translation + 2 pages Official Copy).

Office Action received for German Patent Application No. 212013000197.5, mailed on Apr. 10, 2015, 1 page. (Official Copy only).

Response to Office Action received for German Patent Application No. 212013000197.5, filed on May 15, 2015, 8 pages. (Official Copy Only).

Non-Final Office Action received for U.S Appl. No. 12/979,588, mailed on Oct. 12, 2012, 16 pages.

Response to Non-Final Office Action for U.S. Appl. No. 12/979,588, filed Jan. 9, 2013, 13 pages.

Final Office Action received for U.S. Appl. No. 12/979,588, mailed on Mar. 15, 2013, 20 pages.

Response to Final Office Action for U.S. Appl. No. 12/979,588, filed May 8, 2013, 11 pages.

(56) References Cited

OTHER PUBLICATIONS

Supplemental Response to Final Office Action for U.S. Appl. No. 12/979,588, filed Jun. 12, 2013, 11 pages.
Non-Final Office Action received for U.S. Appl. No. 12/979,588, mailed on Oct. 3, 2013, 17 pages.
Response to Non-Final Office Action for U.S. Appl. No. 12/979,588, filed Jan. 2, 2014, 10 pages.
Final Office Action received for U.S. Appl. No. 12/979,588, mailed on Feb. 24, 2014, 14 pages.
Response to Final Office Action received for U.S. Appl. No. 12/979,588, filed May 8, 2014, 11 pages.
Advisory Action received for U.S. Appl. No. 12/979,588, mailed on May 27, 2014, 2 pages.
Non-Final Office Action received for U.S. Appl. No. 12/979,588, mailed on Jun. 5, 2014, 15 pages.
Response to Non-Final Office Action for U.S. Appl. No. 12/979,588, filed Sep. 5, 2014, 11 pages.
Notice of Allowance received for for U.S. Appl. No. 12/979,588, mailed on Nov. 25, 2014, 8 pages.
Restriction Requirement received for U.S. Appl. No. 13/608,925, mailed on Jun. 11, 2014, 7 pages.
Response to Restriction Requirement for U.S. Appl. No. 13/608,925, filed Aug. 11, 2014, 3 pages.
Non-Final Office Action received for U.S. Appl. No. 13/608,925, mailed on Aug. 29, 2014, 16 pages.
Response to Non-Final Office Action for U.S. Appl. No. 13/608,925, filed Dec. 1, 2014, 10 pages.
Final Office Action received for U.S. Appl. No. 13/608,925, mailed on Jan. 23, 2015, 15 pages.
Response to Final Office Action received for U.S. Appl. No. 13/608,925, filed Apr. 23, 2015, 10 pages.
Non-Final Office Action received for U.S. Appl. No. 13/608,925, mailed on May 15, 2015, 22 pages.
Response to Non-Final Office Action received for U.S. Appl. No. 13/608,925, filed Aug. 14, 2015, 10 pages.
Final Office Action received for U.S. Appl. No. 13/608,925, mailed on Sep. 18, 2015, 21 pages.
Advisory Action received for U.S. Appl. No. 13/608,925, mailed on Dec. 7, 2015, 9 pages.
Response to Final Office Action received for U.S. Appl. No. 13/608,925, filed Dec. 14, 2015, 9 pages.
Non-Final Office Action received for U.S. Appl. No. 13/608,925, mailed on Jan. 21, 2016, 23 pages.
Non-Final Office Action received for U.S. Appl. No. 13/767,837, mailed on Nov. 20, 2014, 13 pages.
Response to Non-Final Office Action received for U.S. Appl. No. 13/767,837, filed Feb. 19, 2015, 12 pages.
Final Office Action received for U.S. Appl. No. 13/767,837, mailed on Jun. 3, 2015, 16 pages.
Advisory Action received for U.S. Appl. No. 13/767,837, mailed on Sep. 25, 2015, 2 pages.
Non-Final Office Action received for U.S. Appl. No. 13/767,837, mailed on Nov. 17, 2015, 17 pages.
Response to Non Final Office Action for U.S. Appl. No. 13/767,837, filed Mar. 15, 2016, 13 pages.
Restricted Requirement received for U.S. Appl. No. 29/431,700, mailed on Sep. 3, 2013, 6 pages.
Response to restriction requirement for U.S. Appl. No. 29/431,700, filed Sep. 27, 2013, 1 page.
Notice of Allowance received for U.S. Appl. No. 29/431,700, mailed on Oct. 17, 2013, 10 pages.
Schock, Jason, "How to Fix a Wobbly Macbook Pro Screen", available online at <schock.net/articles/2012/02/20/how-to-fix-a-wobbly-macbook-pro-screen/>, retrieved on Apr. 16, 2013, 4 pages.
International Search Report and Written Opinion for PCT Application No. PCT/US2016/068855, dated Apr. 12, 2017, 9 Pages.
Search Report for GB Application NO. 1621596.4, dated Jun. 1, 2017, 5 pages.

\* cited by examiner

BASE WITH ROTATING MOUNT THAT INCREASES FRICTION OF ROTATION WHEN PORTABLE COMPUTING DEVICE IS PLACED ONTO MOUNT

TECHNICAL FIELD

This description relates to bases onto which portable computing devices may be mounted.

BACKGROUND

Portable computing devices may be manufactured in a "tablet" form, in which the portable computing device includes a touchscreen but no separate keyboard. A base may include a keyboard and a mount which receives the portable computing device.

SUMMARY

A base for a portable computing device may comprise a keyboard, a frame, a shaft, a mount, and a shaft engagement element. The keyboard may be configured to communicate with the portable computing device. The frame may surround the keyboard. The shaft may be rotationally attached to the frame. The rotational attachment of the shaft to the frame may have a friction greater than a force of gravity on the portable computing device. The mount may be configured to hold the portable computing device. The mount may define a shaft recess through which the shaft extends and in which the shaft freely rotates. The shaft engagement element may be configured to rotationally couple the mount to the shaft in response to the portable computing device being placed on the mount.

A base for a portable computing device may comprise a keyboard, a frame, a shaft, a mount, a shaft engagement element, and an engagement actuator. The keyboard may be configured to communicate with the portable computing device. The frame may surround the keyboard. The shaft may be rotationally attached to the frame, the rotational attachment having a friction greater than a force of gravity on the portable computing device. The mount may be configured to hold the portable computing device. The mount may define a shaft recess through which the shaft extends and in which the shaft freely rotates. The mount may comprise a mount engagement interface. The shaft engagement element may be configured to rotationally couple the mount to the shaft by sliding along the shaft and engaging the mount engagement interface. The engagement actuator may be configured to cause the shaft engagement element to slide along the shaft and engage the mount engagement interface by rotating about the shaft in response to the portable computing device being placed on the mount.

A base for mounting a portable computing device may comprise a frame, a keyboard, a clamp, a shaft, a mount, an engagement actuator, and a shaft engagement element. The frame may be connected to the clamp. The keyboard may be supported by the frame. The clamp may frictionally engage the shaft. The frictional engagement may allow the shaft to frictionally rotate within the clamp. The shaft may comprise a first cylindrical portion, a second cylindrical portion, a non-cylindrical portion, and a third cylindrical portion. The first cylindrical portion may be at a first end portion of the shaft, and the first cylindrical portion may frictionally engaging the clamp. The second cylindrical portion may be farther from the first end portion of the shaft than the first end portion. The second cylindrical portion may be surrounded by a portion of the mount and allow the mount to rotate freely with respect to the shaft when the shaft engagement element is not engaged with a mount engagement interface of the mount. The non-cylindrical portion may be farther from the first end portion of the shaft than the second cylindrical portion. The non-cylindrical portion being may be surrounded by the shaft engagement element. The non-cylindrical portion may allow the shaft engagement element to slide toward and away from the first end portion and not allow the shaft engagement element to rotate around the non-cylindrical portion. The third cylindrical portion may be farther from the first end portion than the non-cylindrical portion. The third cylindrical portion may be surrounded by an engagement actuator and allow the engagement actuator to rotate freely around the third cylindrical portion. The mount may be configured to hold the portable computing device. The mount may define a cylindrical recess surrounding the second cylindrical portion of the shaft. The mount may comprise the mount engagement interface. The engagement actuator may be configured to force a shaft engagement element toward the mount engagement interface in response to the portable computing device being placed in the mount. The shaft engagement element may be configured to engage the mount engagement interface and rotationally couple the mount to the shaft in response to the engagement actuator forcing the shaft engagement element toward the mount engagement interface.

The details of one or more implementations are set forth in the accompanying drawings and the description below. Other features will be apparent from the description and drawings, and from the claims.

DETAILED DESCRIPTION

A base for a portable computing device may include a frame supporting a keyboard and a mount rotationally attached to the frame. When no portable computing device is placed onto the mount, the mount may rotate freely with respect to the frame. The free rotation may enable a user of the device to easily reconfigure the base when the base is not in use. When a portable computing device is placed onto the mount, a friction element may engage inside the mount, increasing a friction of rotation between the mount and the frame. The friction of rotation may be greater than a force of gravity and/or torque on the portable computing device when the portable computing device is mounted on the mount. The greater friction of rotation than the force of gravity and/or torque on the portable computing device may cause the mount to stay in a specific position with respect to the frame until the user applies sufficient force to the portable computing device to overcome the friction and rotate the mount, causing the portable computing device to maintain an angle with respect to the frame and keyboard as desired by the user.

Figure 1A:
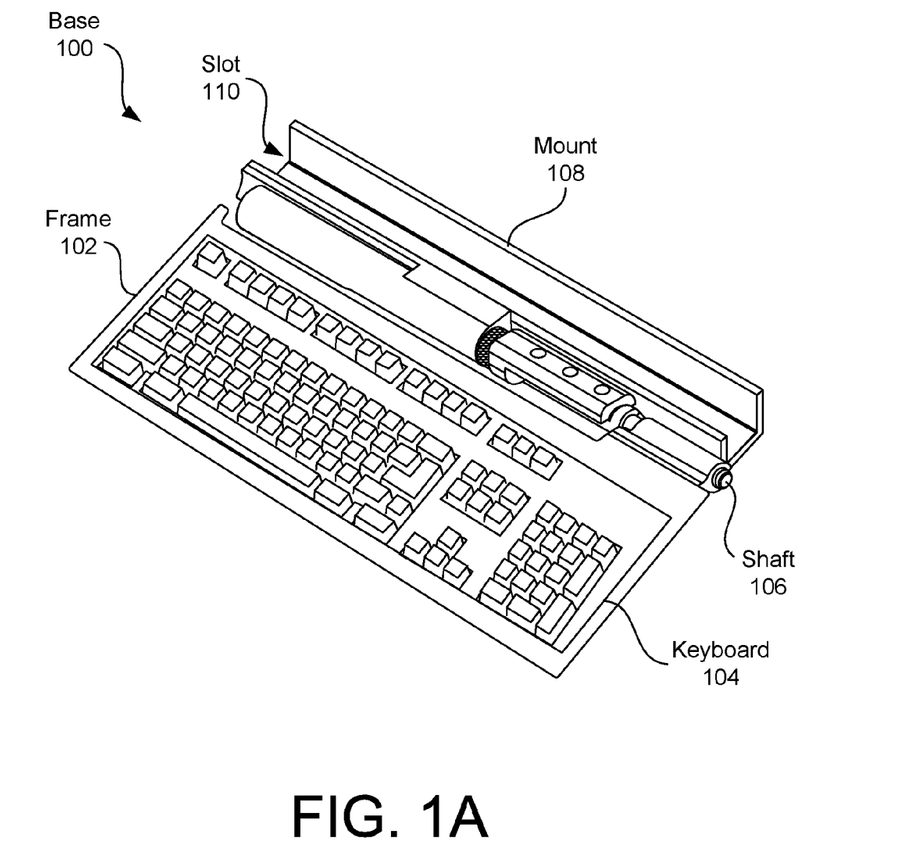
FIG. 1A is a diagram of a base according to an example embodiment.

FIG. 1A is a diagram of a base 100 according to an example embodiment. The base 100 may include a mount 108 rotationally attached to a frame 102. The rotational attachment may include a shaft 106 that extends through a cylindrical recess defined by the frame 102 and through a rotational recess defined by the mount 108. In an example embodiment, the shaft 106 may be tightly engaged with the portion of the frame 102 defining the cylindrical recess, generating friction when the frame 102 rotates about the shaft 106. When a portable computing device (not shown in FIG. 1A) has not been placed onto the mount 108, the mount 108 may rotate freely with respect to the shaft 106, allowing the mount 108 to freely rotate with respect to the frame 102. When a portable computing device is placed onto the mount 108, the mount 108 may rotationally couple to the shaft 106, preventing the mount 108 from rotating with respect to the shaft 106, so that the mount 108 rotates with respect to the frame 102 with the same friction that the frame 102 rotates about the shaft 106.

The mount 108 may define a slot 110. The slot 110 may extend through the mount 108 in a direction generally parallel to, such as within five degrees (5°) of, a direction in which the shaft 106 extends through the mount 108 and/or frame 102. The slot 110 may be configured to receive a portable computing device such as a tablet computer (shown in FIG. 1B). The portion of the mount 108 defining the slot 110 may frictionally engage the portable computing device to hold the portable computing device within the slot 110 until a user removes the portable computing device from the slot 110. The mount 108 may be made of a material that is not attractive to magnets and/or is nonmagnetic, such as plastic.

The frame 102 may surround a keyboard 104. The keyboard 104 may include keys such as alphanumeric keys, symbol keys, and/or modifier keys. The keyboard 104 may receive input from a user and provide the input to the portable computing device. The keyboard 104 may be communicate with the portable computing device by a wireless interface such as Institute for Electrical and Electronics Engineers (IEEE) 802.15 (Bluetooth), Near Field Communication (NFC), or Radio Frequency Identification (RFID), as non-limiting examples. In other example implementations, the keyboard 104 may communicate with the portable computing device via a wired interface, such as via wires extending from the keyboard 104 through the frame 102 and mount 108 into the slot 110, where the wired interface may couple with the portable computing device.

Figure 1B:
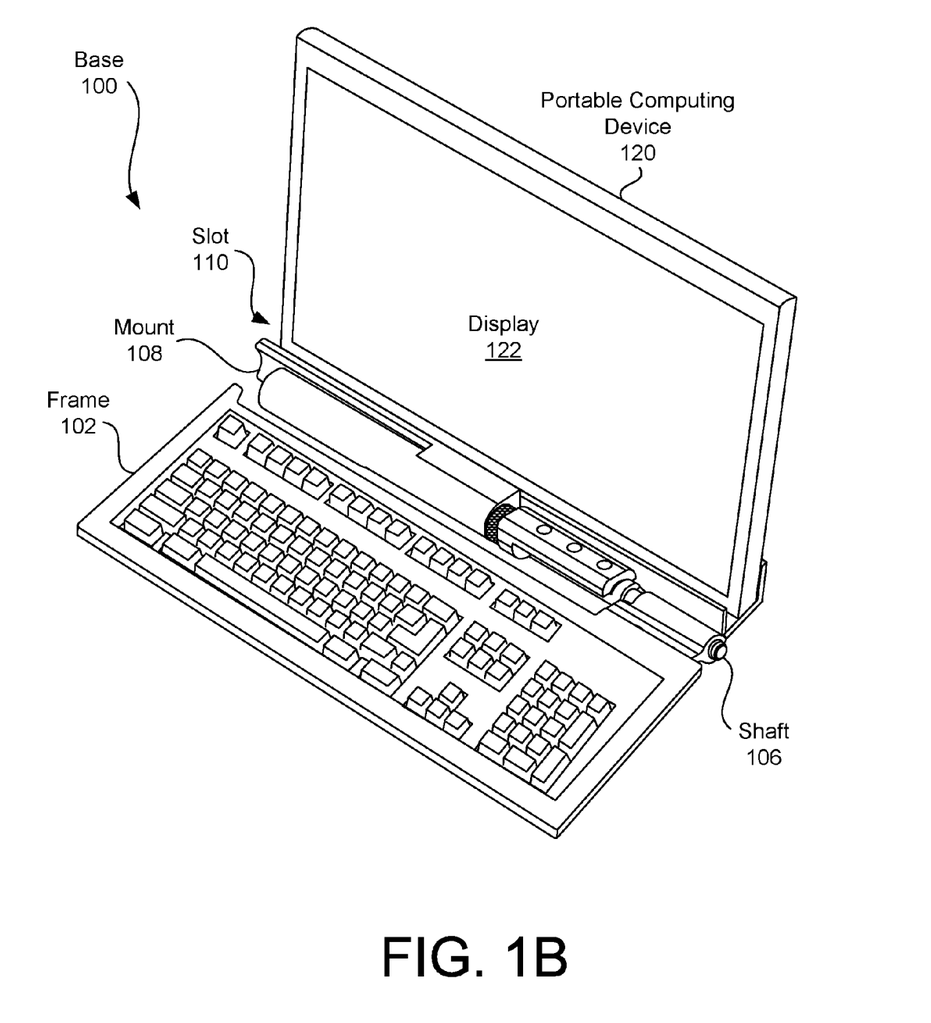
FIG. 1B is a diagram of the base with a portable computing device placed into a mount of the base according to an example embodiment.

FIG. 1B is a diagram of the base 100 with a portable computing device 120 placed into a mount 108 of the base 100 according to an example embodiment. In this example, the portable computing device 120, which may include a tablet computing device, has been placed into the slot 110 of the base 100. The portable computing device 120 may include a display 122, which may include a touchscreen that receives and processes tactile input from a user, but no hard keyboard with physical keys. The portable computing device 120 may be made of a single rigid, unitary structure, with no folding or rotating parts to which other components such as a keyboard would be attached. The portable computing device 120 may be friction-fitted into the slot 110 of the mount 108, so that the portable computing device 120 remains in the slot 110 until the portable computing device 120 is removed from the slot 110 by the user.

In response to the portable computing device 120 being placed into the slot 110 of the mount 108, the mount 108 may engage a friction mechanism and/or rotationally couple to the shaft 106, so that the friction mechanism and/or rotational coupling of the mount 108 to the shaft 106 causes friction to oppose and/or resist rotation of the mount 108 and/or portable computing device 120 with respect to the frame 102. The friction may cause the portable computing device 120 and/or mount to remain in position with respect to the frame 102 until a user applies sufficient force and/or pressure to overcome the friction and rotate the portable computing device 120 and/or mount 108 with respect to the frame 102.

Figure 2A:
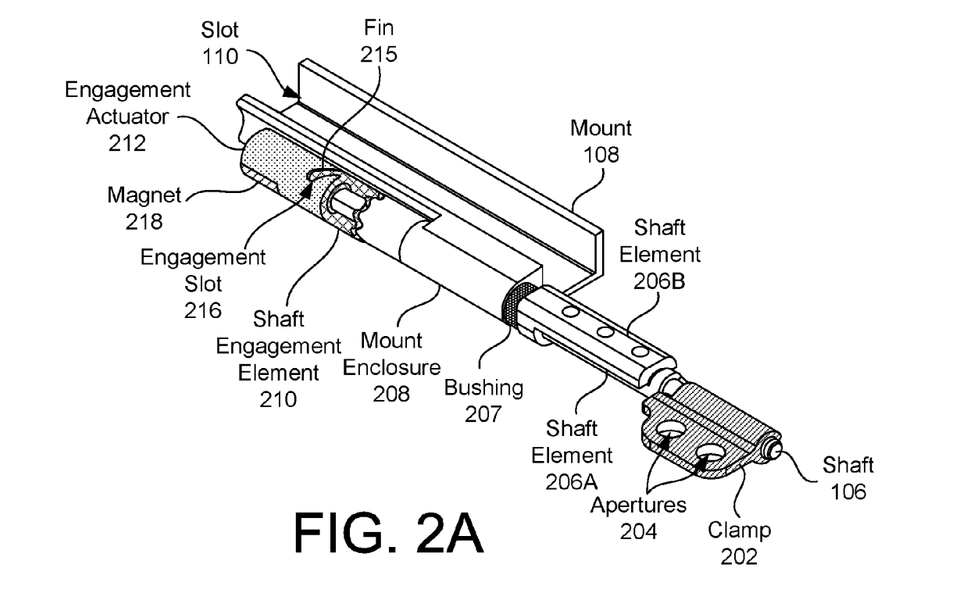
FIG. 2A shows components of the base according to an example embodiment.

FIG. 2A shows components of the base 100 according to an example embodiment. In this example, as well as the examples shown in FIGS. 2B, 2C, 2D, 2E, 2F, 2G 2H, and 3, a portion of the mount 108 is cut away for illustrative purposes.

The base 100 may include a clamp 202 surrounding a portion of the shaft 106. The clamp 202 may be integral with the frame 102 (not shown in FIG. 2A), or may be attached to the frame 102 via fasteners such as bolts extending through apertures 204 extending through the clamp 202. The clamp 202 may be tightly wrapped around the portion of the shaft 106 to create friction that opposes rotation of the clamp 202 and shaft 106 with respect to each other until a user applies sufficient force to overcome the friction.

The base 100 may include one or more shaft elements 206A, 206B between the clamp 202 and the mount 108. While FIG. 2A shows a shaft element 206A that may be coupled to a shaft element 206B by fasteners, the shaft element(s) between the clamp 202 and the mount 108 may also be made of a single unitary structure that is continuous with the shaft 106. The shaft elements 206A, 206B (as well as shaft elements 206C, 206D described below with respect to FIG. 2B) may be considered components of the shaft 106.

The base 100 may include bushing 207. The bushing 207 may be disposed between the shaft element(s) 206A, 206B and the mount 108. The disposition of the bushing 207 between the shaft element(s) 206A, 206B and the mount 108 may prevent the shaft element(s) 206A, 206B and the mount 108 from rubbing against each other when the shaft element(s) 206A, 206B and the mount 108 rotate with respect to each other, preventing damage to the shaft element(s) 206A, 206B and/or the mount 108.

The mount 108 may include a mount enclosure 208. A portion of the mount enclosure 208 may form a portion of a wall and/or side that defines a portion of the slot 110. The mount enclosure 208 may be adjacent to the slot 110. The mount enclosure 208 may define a cylinder through which the shaft 106 (and/or a shaft element 206C) extends and within which the shaft 106 may freely rotate when the friction mechanism of the base 100 is not engaged.

The base 100 may include a shaft engagement element 210. The shaft engagement element 210 may slide along the shaft (and/or a shaft element 206D) toward and away from the clamp 202 and/or mount enclosure 208, but may not rotate around the shaft. In response to the portable computing device 120 (not shown in FIG. 2A) being placed into the slot 110 of the mount 108, the shaft engagement element 210 may slide toward the mount enclosure 208 and mate with the mount enclosure 208. The mating of the shaft engagement element 210 with the mount enclosure 208 may rotationally couple the shaft engagement element 210 to the mount enclosure 208, preventing the mount enclosure 208 from rotating with respect to the shaft engagement element 210. Because the shaft engagement element 210 cannot rotate around the shaft 106 (and/or shaft element 206D), the mating of the mount enclosure 208 with the shaft engagement element 210 will rotationally couple the mount enclosure 208, and the entire mount 108, to the shaft 106. Because the shaft 106 is frictionally engaged to the clamp 202 and frame 102, the mating of the mount enclosure 208 to the shaft engagement element 210 may increase the friction opposing and/or resisting rotation of the mount 108 with respect to the frame 102 and keyboard 104, causing the mount 108 and portable computing device 120 to remain in position with respect to the frame 102 and keyboard 104 until the user applies sufficient force to the portable computing device 120 and/or mount 108 to overcome the friction and rotate the portable computing device 120 and/or mount with respect to the frame 102 and keyboard 104.

The base 100 may include an engagement actuator 212. The engagement actuator 212 may, in response to the portable computing device 120 being placed into the slot 110 of the mount 108, force the shaft engagement element 210 toward the mount enclosure 208, causing the shaft engagement element 210 to mate with the mount enclosure 208. In an example embodiment, the engagement actuator 212 may rotate freely abut the shaft 106. The engagement actuator 212 may rotate about the shaft 106 in response to the portable computing device 120 being placed into the slot 110 of the mount 108, and the rotation of the engagement actuator 212 about the shaft 106 may force the shaft engagement element 210 toward the mount enclosure 208.

In the example shown in FIG. 2A, the shaft engagement element 210 may include a fin 215. The fin 215 may extend away from the shaft engagement element 210 toward the engagement actuator 212, and into an engagement slot 216 defined by the engagement actuator 212. The fin 215 and the engagement slot 216 may each be curved and/or have curved shapes. The rotation of the engagement actuator 212 in response to the portable computing device 120 being placed into the slot 110 of the mount 108 may cause a portion of the engagement actuator 212 defining the engagement slot 216, which is farther from the shaft engagement element 210, to apply pressure and/or force to the fin 215, forcing the fin 215 and shaft engagement element 210 away from the engagement actuator 212 and toward the mount enclosure 208, causing the shaft engagement element 210 to mate with the mount enclosure 208.

In an example embodiment, the engagement actuator 212 may include a magnet 218. The magnet 218 may cause the engagement actuator 212 to rotate in response to the portable computing device 120 being placed into the slot 110 of the mount 108. The magnet 218 may be attracted to a metal and/or magnetic (with opposite polarity from the magnet 218) portion of the portable computing device 120, causing the engagement actuator 212 to rotate toward the portable computing device 120 in the slot 110 in response to the portable computing device 120 being placed into the slot 110.

The magnet 218 may have a greater density, and/or may be made of a denser material, than other portions of the engagement actuator 212. The greater density of the magnet 218 may cause the force of gravity and/or gravitational force to, when the portable computing device 120 is removed from the slot 110, rotate the engagement actuator 212 in an opposite direction than the direction in which the engagement actuator 212 rotated when the portable computing device 120 was placed into the slot 110.

Figure 2B:
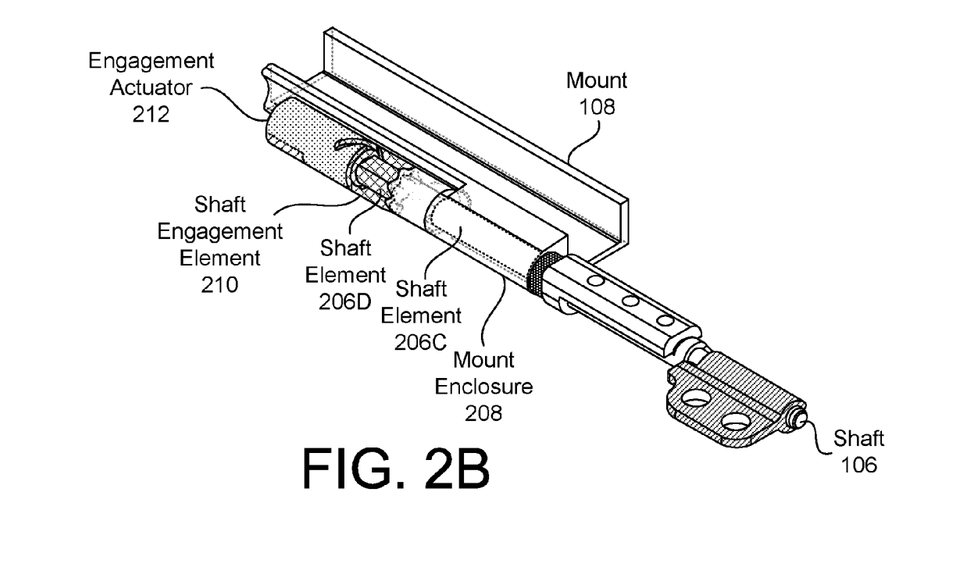
FIG. 2B is a diagram showing interior features of the base according to an example embodiment.

FIG. 2B is a diagram showing interior features of the base 100 according to an example embodiment. In this example, a shaft element 206C, which extends through the mount enclosure 208, is cylindrical. The cylindrical shape of the shaft element 206C, which may be considered a component of the mount 108, may allow the mount enclosure 208 and/or mount 108 to freely rotate about the shaft 106 and/or shaft element 206C when the friction element of the base 100 is not engaged.

In the example shown in FIG. 2B, a shaft element 206D, which extends through the shaft engagement element 210, has at least one portion that is non-cylindrical, such as a flat exterior portion. The shaft element 206D may, for example, be prism-shaped. The non-cylindrical shape of the shaft element 206D may allow the shaft engagement element to slide toward and away from the mount enclosure 208, but prevent the shaft engagement element 210 from rotating about the shaft element 206D, rotationally coupling the shaft engagement element 210 to the shaft 106.

Figure 2C:
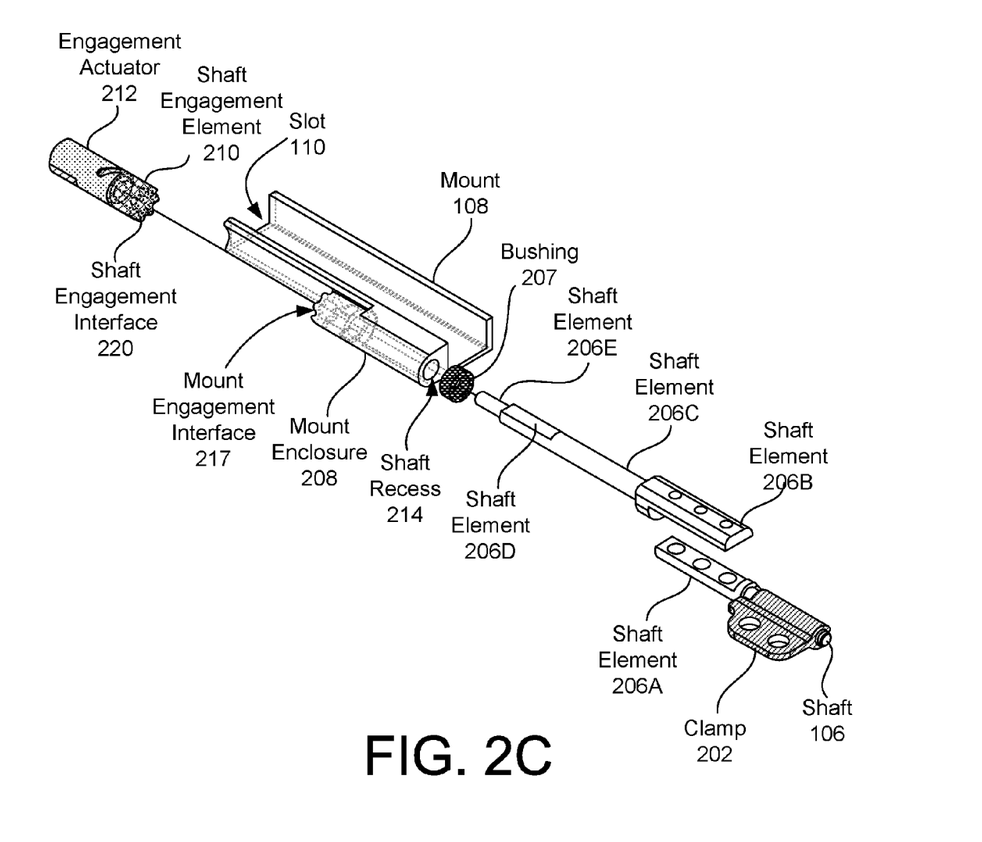
FIG. 2C is an exploded view of some components of the base according to an example embodiment.

FIG. 2C is an exploded view of some components of the base 100 according to an example embodiment. As shown in FIG. 2C, the clamp 202 surrounds a portion of the shaft 106, and may frictionally engage the shaft 106 to resist rotation of the shaft 106 within the clamp 202 until the user applies sufficient force to overcome the friction.

The shaft 106 may also include shaft elements 206A, 206B, 206C, 206D, 206E. Shaft elements 206A, 206B may be attached to each other by fasteners such as threaded bolts extending through apertures and secured by threaded nuts on an opposite side of the shaft elements 206A, 206B. The shaft element 206C may be cylindrical to allow the mount enclosure 208 to freely rotate about the shaft element 206C, when the shaft element 206C is inside the shaft recess 214 defined by the mount enclosure 208. The shaft element 206D may be non-cylindrical, and/or may have one or more flat or non-circular portions, preventing the shaft engagement element 210 from rotating about the shaft element 206D. The shaft element 206E may be cylindrical, allowing the shaft engagement element 210 to freely rotate about the shaft element 206E. In an example embodiment, the end portion of the shaft 106 may be considered a first cylindrical portion of the shaft, the shaft element 206C may be considered a second cylindrical portion of the shaft, the shaft element 206D may be considered a non-cylindrical portion of the shaft, and the shaft element 206E may be considered a third cylindrical portion of the shaft. The bushing 207 may prevent the shaft element 206B from rubbing against the mount enclosure 208 and/or mount 108.

The mount 108 may include the mount enclosure 208. The mount enclosure 208 may define a shaft recess 214. The shaft recess 214 may be cylindrical to allow the shaft element 206C to freely rotate within the shaft recess 214. The shaft recess 214 may extend generally parallel to, such as within five degrees (5°) of, the slot 110.

The mount enclosure 208 may include a mount engagement interface 217. The mount engagement interface 217 may be at an opposite end of the mount enclosure 208 from the clamp 202. The mount engagement interface 217 may interlock with a shaft engagement interface 220 of the shaft engagement element 210 to prevent the shaft engagement element 210 from rotating with respect to the mount 108 and/or shaft 106 when the frictional engagement mechanism is actuated in response to the portable computing device 120 (not shown in FIG. 2C) being placed into the slot 110. The mount engagement interface 217 may include teeth (which may be considered mount teeth), ridges, or other non-smooth features to interlock with the shaft engagement interface 220 of the shaft engagement element 210.

The shaft engagement element 210 may include the shaft engagement interface 220. The shaft engagement interface 220 may include teeth (which may be considered shaft engagement teeth), ridges, or other non-smooth features to interlock with the mount engagement interface 217 of the mount enclosure 208. The shaft engagement interface 220 may interlock and/or engage with the mount engagement interface 217 of the mount enclosure to prevent the shaft engagement element 210 from rotating with respect to the mount enclosure 208, mount 108, and/or shaft 106 when the frictional engagement mechanism is actuated. The engagement actuator 212 may cause the shaft engagement element 210 to move toward the mount enclosure 208, causing the shaft engagement interface 220 to interlock with the mount engagement interface 217, by rotating in response to the portable computing device 120 being placed into the slot 110.

Figure 2D:
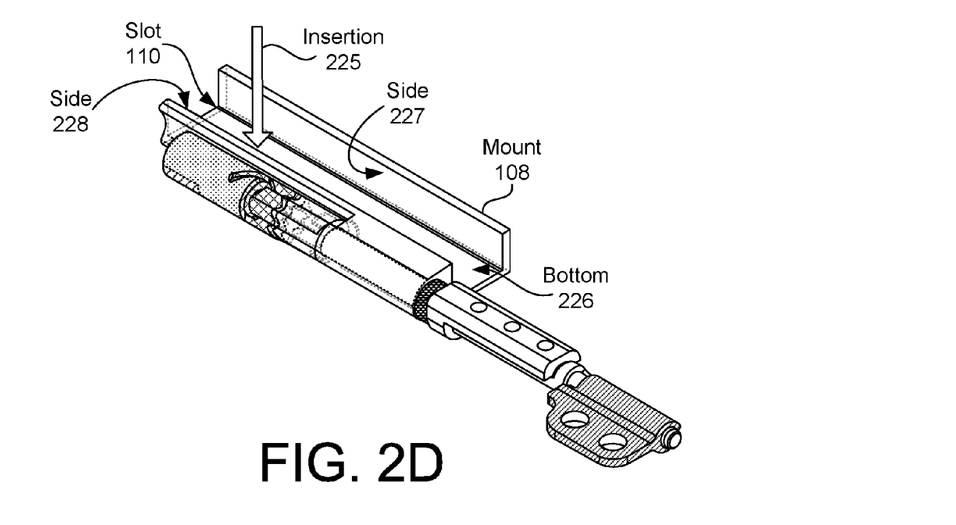
FIG. 2D shows a direction of insertion of the portable computing device into the mount of the base according to an example embodiment.

FIG. 2D shows a direction of insertion 225 of the portable computing device 120 (not shown in FIG. 2D) into the mount 108 of the base 100 according to an example embodiment. The portable computing device 120 may be inserted into the slot 110 in the direction of insertion 225, which is toward a bottom 226 of the slot 110. The bottom 226 of the mount 108, as well as sides 227, 228 of the mount 108, which extend generally perpendicular to, such as between eighty-five and ninety-five degrees (95°) of, a plane extending along the bottom 226, may define the slot 110. A height of the mount 108, as measured from the bottom 226 of the mount 108 to the top of the sides 227, 228, may be between six and seven millimeters, and/or between five and eight millimeters, keeping a size and/or thickness of the mount 108 and base 100 small.

Figure 2E:
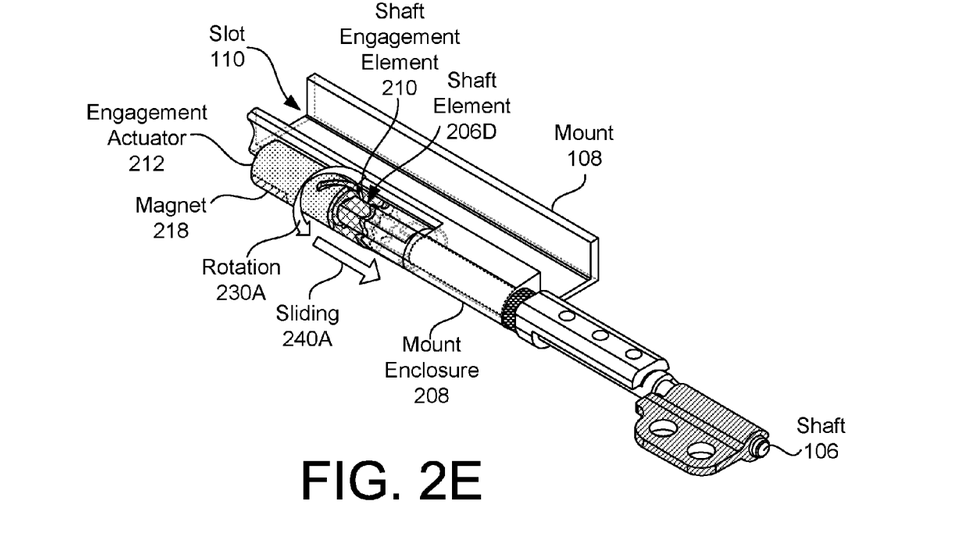
FIG. 2E shows a direction of rotation of an engagement actuator and a direction of sliding of a shaft engagement element when the portable computing device is placed onto the mount according to an example embodiment.

FIG. 2E shows a direction of rotation 230A of the engagement actuator 212 and a direction of sliding 240A of the shaft engagement element 210 when the portable computing device 120 (not shown in FIG. 2E) is placed onto the mount 108 according to an example embodiment. The magnet 218 included in the engagement actuator 212 may be attracted to metal and/or one or more magnets included in the portable computing device 120, causing the engagement actuator 212 to rotate in the direction of rotation 230A in response to the portable computing device 120 being placed into the slot 110 and/or proximal to the magnet 218. The rotation of the engagement actuator 212 may force the shaft engagement element 210 to slide along the shaft element 206D toward the mount 108 in the direction of sliding 240A, causing the shaft engagement interface 220 (not labeled in FIG. 2E) to interlock with the mount engagement interface 217 (not labeled in FIG. 2E), rotationally coupling the shaft engagement element 210 to the mount 108 and/or shaft 106.

Figure 2F:
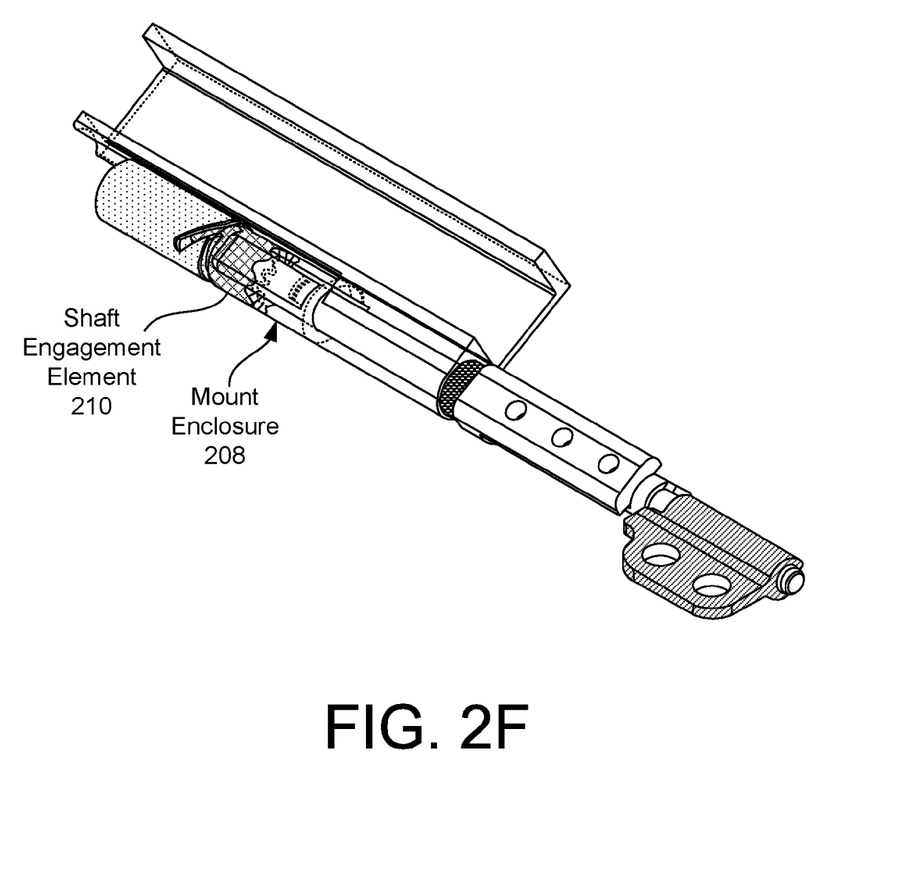
FIG. 2F shows the shaft engagement element rotationally coupled to the mount enclosure according to an example embodiment.

FIG. 2F shows the shaft engagement element 210 rotationally coupled to the mount enclosure 208 according to an example embodiment. The engagement element 210 may be rotationally coupled to the mount enclosure 208 after the engagement actuator 212 has forced the shaft engagement element 210 toward the mount 108, as described above with respect to FIG. 2E.

Figure 2G:
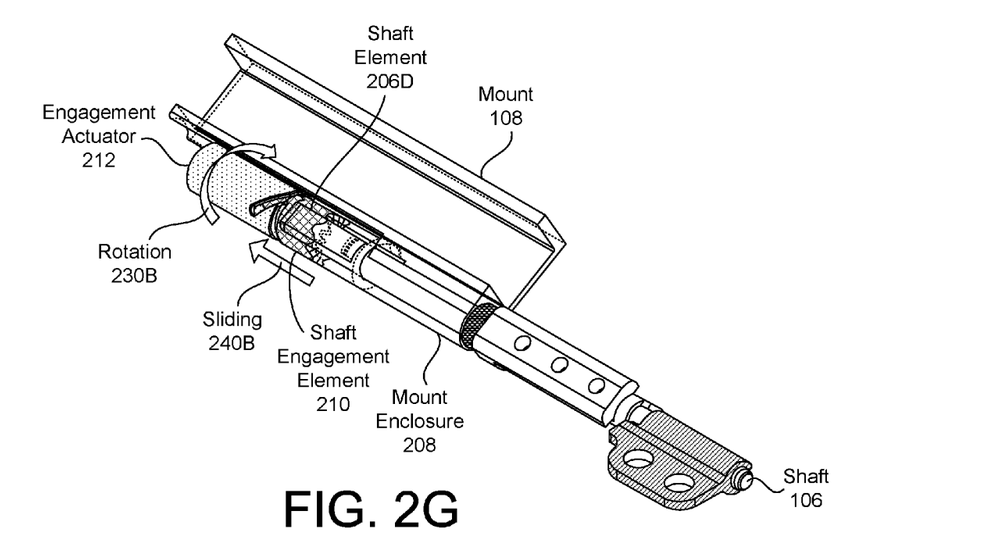
FIG. 2G shows a direction of rotation of the engagement actuator and a direction of sliding of the shaft engagement element when the portable computing device is removed from the mount according to an example embodiment.

FIG. 2G shows a direction of rotation 230B of the engagement actuator 212 and a direction of sliding 240B of the shaft engagement element 210 when the portable computing device 120 (not shown in FIG. 2G) is removed from the mount 108 according to an example embodiment. In this example, when the magnetic attraction of the magnet 218 (not shown in FIG. 2G) toward the portable computing device 120 is no longer present, the force of gravity pulling on the magnet 218 may cause the engagement actuator 212 to rotate in the direction of rotation 230B, which is opposite from the direction of rotation 230A when the portable computing device 120 is placed onto the mount 108. The rotation of the engagement actuator 212 in the direction of rotation 230B may cause the engagement actuator 212 to pull the shaft engagement element 210 along the shaft element 206D in a direction of sliding 240B, which is opposite from the direction of sliding 240B, away from the mount enclosure 208, disengaging the shaft engagement element 210 from the mount enclosure 208 and allowing the mount 108 to freely rotate with respect to the shaft 106.

Figure 2H:
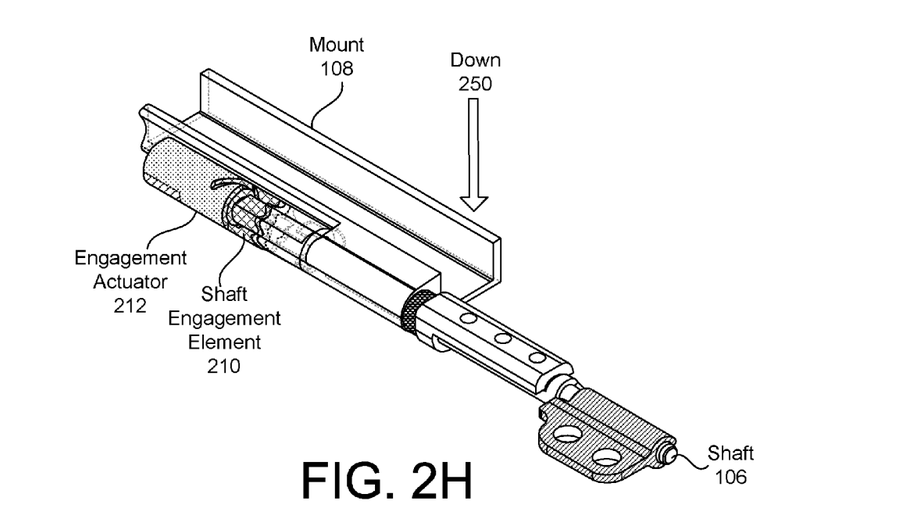
FIG. 2H shows the engagement actuator back in an original position after the portable computing device has been removed from the mount according to an example embodiment.

FIG. 2H shows the engagement actuator 212 back in an original position after the portable computing device 120 (not shown in FIG. 2H) has been removed from the mount 108 according to an example embodiment. After the engagement actuator 212 has rotated back to the original position of the engagement actuator 212 (shown in FIGS. 2A, 2B, and 2D) and the shaft engagement element 210 has disengaged from the mount 108, the mount 108 may freely rotate about the shaft 106. The free rotation of the mount 108 about the shaft 106 may cause the force of gravity to pull the mount 108 in a down 250 direction.

Figure 3:
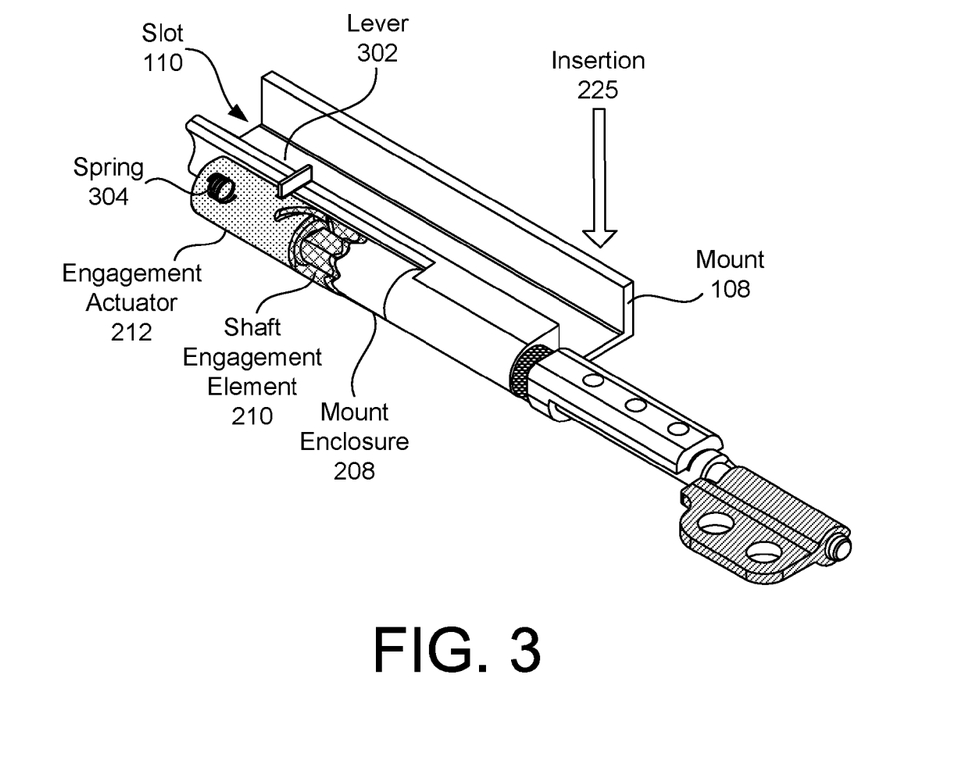
FIG. 3 shows some components of an example base in which a lever causes the shaft engagement element to rotationally couple to the mount in response to the portable computing device being placed on the mount according to an example embodiment.

FIG. 3 shows some components of an example base 100 in which a lever 302 causes the shaft engagement element 210 to rotationally couple to the mount 108 in response to the portable computing device 120 (not shown in FIG. 3) being placed on the mount 108 according to an example embodiment. This example base 100 may include any combination of the features of the base 100 described above.

In the example shown in FIG. 3, the portable computing device 120 may apply pressure to the lever 302. The lever 302 may be rotationally attached to the mount 108, and a portion of the lever 302 may extend into the slot 110 when the slot 110 is empty and/or no portable computing device is inside the slot 110. The lever 302 may respond to the pressure by causing the engagement actuator 212 to rotate, forcing the shaft engagement element 210 to engage with and/or rotationally couple with the mount enclosure 208, as described above.

The engagement actuator 212 may include a spring 304. The spring 304 may cause the engagement actuator 212 to return to the original position of the engagement actuator 212 after the portable computing device 120 is removed from the mount 108 and the pressure has been relieved from the lever 302. The return of the engagement actuator 212 to the original position may pull the shaft engagement element 210 away from the mount enclosure 208, decoupling the mount 108 from the shaft engagement element 210 and the shaft 106, allowing the mount 108 to freely rotate with respect to the shaft 106, as described above with respect to FIG. 2G.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A base for a portable computing device, the base comprising:
   a keyboard configured to communicate with the portable computing device;
   a frame surrounding the keyboard;
   a shaft rotationally attached to the frame, the rotational attachment of the shaft to the frame having a friction greater than a force of gravity on the portable computing device;
   a mount configured to hold the portable computing device, the mount defining a shaft recess through which the shaft extends and in which the shaft freely rotates; and
   a shaft engagement element configured to rotationally couple the mount to the shaft in response to the portable computing device being placed on the mount.

2. The base of claim 1, wherein the shaft engagement element is rotationally coupled to the shaft.

3. The base of claim 1, wherein the shaft engagement element is configured to slide longitudinally along the shaft but cannot rotate around the shaft.

4. The base of claim 1, wherein the shaft engagement element is configured to rotationally couple the mount to the shaft by sliding along the shaft and engaging a mount engagement interface of the mount in response to the portable computing device being placed on the mount.

5. The base of claim 4, further comprising an engagement actuator configured to cause the shaft engagement element to slide along the shaft and engage the mount engagement interface by rotating about the shaft and pressing a fin, which extends from the shaft engagement element, away from the engagement actuator and toward the mount engagement interface.

6. The base of claim 5, wherein:
   the mount engagement interface comprises mount teeth; and
   the shaft engagement element comprises shaft engagement teeth, the shaft engagement teeth being configured to mate with the mount teeth.

7. The base of claim 5, wherein the engagement actuator comprises a magnet configured to cause the engagement actuator to rotate about the shaft in response to the portable computing device being placed on the mount.

8. The base of claim 5, wherein the engagement actuator comprises a magnet configured to cause the engagement actuator to rotate about the shaft in response to the portable computing device being placed on the mount.

9. The base of claim 5, wherein the fin has a curved shape.

10. The base of claim 5, wherein the mount comprises a lever configured to cause the engagement actuator to rotate about the shaft in response to the portable computing device pressing the lever while the portable computing device is placed on the mount.

11. The base of claim 1, wherein the mount comprises a lever configured to cause the shaft engagement element to rotationally couple the mount to the shaft in response to the portable computing device pressing the lever while the portable computing device is placed on the mount.

12. The base of claim 11, wherein the base comprises a spring configured to cause the shaft engagement element to decouple the mount from the shaft in response to the portable computing device being removed from the mount.

13. The base of claim 1, wherein the mount defines a slot configured to hold the portable computing device.

14. A base for a portable computing device, the base comprising:
   a keyboard configured to communicate with the portable computing device;
   a frame surrounding the keyboard;
   a shaft rotationally attached to the frame, the rotational attachment having a friction greater than a force of gravity on the portable computing device;
   a mount configured to hold the portable computing device, the mount defining a shaft recess through which the shaft extends and in which the shaft freely rotates, the mount comprising a mount engagement interface;
   a shaft engagement element configured to rotationally couple the mount to the shaft by sliding along the shaft and engaging the mount engagement interface; and
   an engagement actuator configured to cause the shaft engagement element to slide along the shaft and engage the mount engagement interface by rotating about the shaft in response to the portable computing device being placed on the mount.

15. The base of claim 14, wherein the engagement actuator comprises a magnet configured to cause the engagement actuator to rotate about the shaft in response to the portable computing device being placed on the mount.

16. The base of claim 15, wherein the magnet comprises a denser material than remaining portions of the engagement actuator, the denser material of the magnet causing a gravitational force to rotate the engagement actuator in an opposite direction when the portable computing device is removed from the mount.

17. A base for mounting a portable computing device, the base comprising:
   a frame connected to a clamp;
   a keyboard supported by the frame;
   the clamp frictionally engaging a shaft, the frictional engagement allowing the shaft to frictionally rotate within the clamp;
   the shaft comprising:
      a first cylindrical portion at a first end portion of the shaft, the first cylindrical portion frictionally engaging the clamp;
      a second cylindrical portion farther from the first end portion of the shaft than the first end portion, the second cylindrical portion being surrounded by a portion of a mount and allowing the mount to rotate freely with respect to the shaft when a shaft engagement element is not engaged with a mount engagement interface of the mount;
      a non-cylindrical portion farther from the first end portion of the shaft than the second cylindrical portion, the non-cylindrical portion being surrounded by a shaft engagement element, the non-cylindrical portion allowing the shaft engagement element to slide toward and away from the first end portion and not allowing the shaft engagement element to rotate around the non-cylindrical portion; and a third cylindrical portion farther from the first end portion than the non-cylindrical portion, the third cylindrical portion being surrounded by an engagement actuator and allowing the engagement actuator to rotate freely around the third cylindrical portion;

the mount configured to hold the portable computing device, the mount defining a cylindrical recess surrounding the second cylindrical portion of the shaft, the mount comprising the mount engagement interface;

the engagement actuator configured to force a shaft engagement element toward the mount engagement interface in response to the portable computing device being placed in the mount; and the shaft engagement element configured to engage the mount engagement interface and rotationally couple the mount to the shaft in response to the engagement actuator forcing the shaft engagement element toward the mount engagement interface.

18. The base of claim 17, wherein the engagement actuator is configured to rotate around the third cylindrical portion of the shaft in response to the portable computing device being placed in the mount, the rotation of the engagement actuator forcing the shaft engagement element toward the mount engagement interface.

19. The base of claim 18, wherein the engagement actuator comprises a magnet configured to cause the engagement actuator to rotate in response to the portable computing device being placed on the mount.

20. The base of claim 19, wherein the magnet comprises a denser material than other portions of the engagement actuator.

* * * * *